Feb. 8, 1938. W. W. FRYMOYER 2,107,632
COMPENSATED MEASURING INSTRUMENT
Filed Aug. 20, 1935 2 Sheets-Sheet 1

Inventor:
Webster W. Frymoyer,
by Emery, Booth, Townsend, Miller & Weidner
Attys Feb. 8, 1938. W. W. FRYMOYER 2,107,632
COMPENSATED MEASURING INSTRUMENT
Filed Aug. 20, 1935 2 Sheets-Sheet 2

Inventor:
Webster W. Frymoyer,
by Emery, Booth, Townsend, Miller & Whitney
Attys Patented Feb. 8, 1938

2,107,632

UNITED STATES PATENT OFFICE 2,107,632

COMPENSATED MEASURING INSTRUMENT

Webster W. Frymoyer, Foxboro, Mass., assignor to The Foxboro Company, Foxboro, Mass., a corporation of Massachusetts Application August 20, 1935, Serial No. 37,032

5 Claims. (Cl. 73—31)

This invention relates to measuring instruments, which measure through the fluctuations of some variable condition due to the variations of the magnitude being measured and the object is to provide an accurate and smoothly operating device of this nature, the reading of which is compensating for the effect of some other variable condition, the changes of which alter the proportionality between the first-mentioned variable condition and the magnitude to be measured. A particular application is to pressure responsive instruments, and, by way of example, I have herein shown a compensated manometer for measuring the flow of fluid.

My invention will be well understood by reference to the following description, taken in connection with the accompanying drawings, wherein.

The measurement of the flow of liquid by means of a restriction, such as an orifice plate, in the conduit through which it flows is commonly made by means of the differential of pressure at opposite sides of the restriction. In the case of an incompressible fluid under constant temperature conditions, or where the variations of temperature may be ignored, the rate of flow may be determined from the differential pressure measured by means of a suitable differential manometer, such as that described in United States Patent No. 1,592,415. In considering more completely the conditions of flow, as in the instance of a compressible fluid, the equation of flow may be expressed by the following equation:—

Where $$W = KEd^2 \sqrt{\frac{hP}{T}}$$

W=mass rate of flow
K=constants of equation
E=orifice coefficient
d=diameter of orifice
h=differential pressure across orifice
P=absolute pressure
T=absolute temperature I have herein shown a differential manometer having means for compensating movements of the differential pressure measuring device for the effect of a suitable variable, such, for example, as the absolute pressure or the absolute temperature referred to in the above equation, and its application in series for compensating for further variables will be readily understood. Herein, the measuring instrument has a manifesting device, such as the recording pen 5, the position of which is proportional to the instantaneous values of two variables, a primary variable representing the differential pressure, and a modifying variable such as static pressure.

Figure 1:
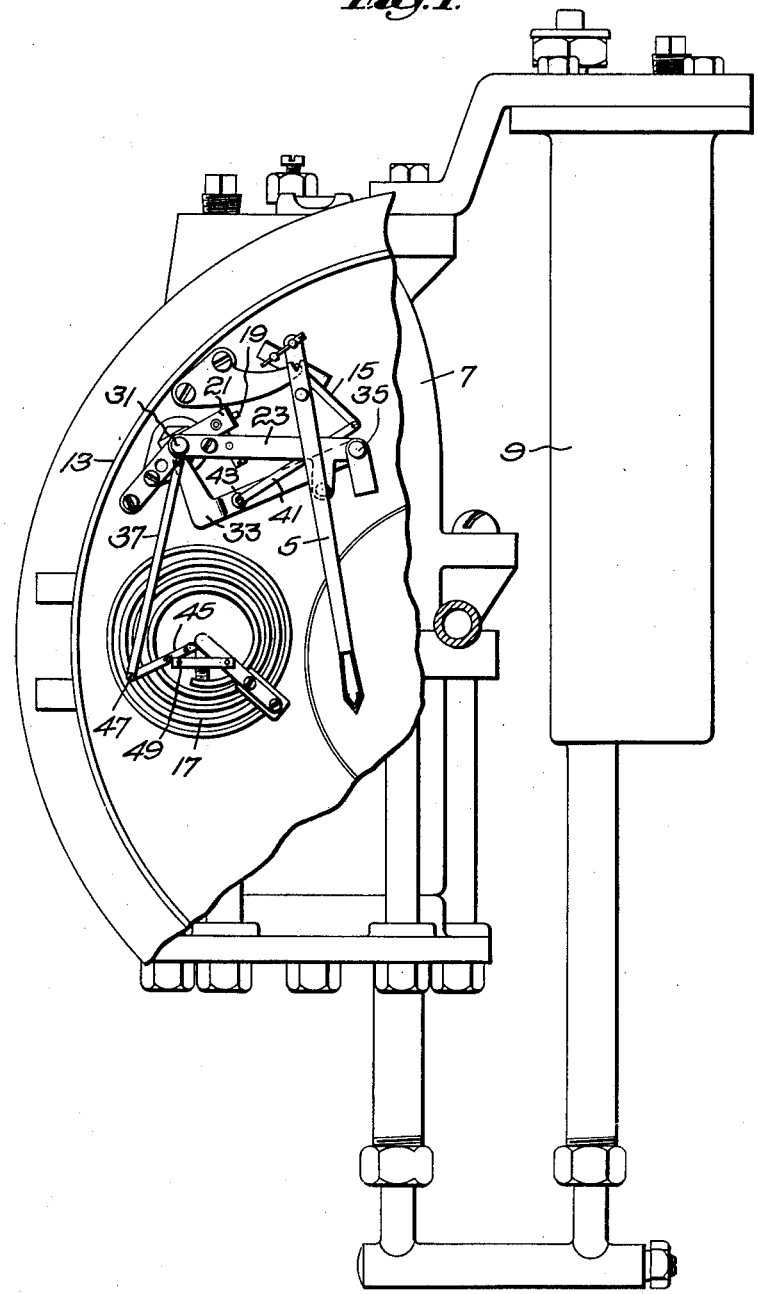
Fig. 1 is a front elevation, with parts broken away, of a recording flow-meter embodying the invention.
Figure 3:
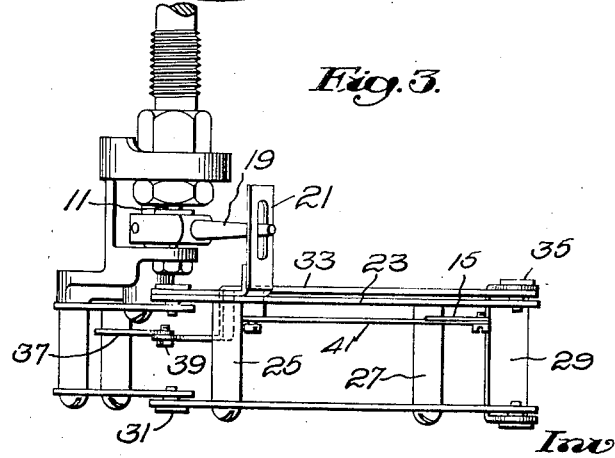
Fig. 3 is a plan thereof, with parts omitted.

Referring to Fig. 1, I have there shown, partly broken away, a recording differential manometer of the mercury U-tube type, having the communicating mercury-containing chambers or wells 7 and 9, within the former of which works a float, not shown, which turns the shaft 11, Fig. 3, projecting into the case 13 of the instrument, proportionately to a differential pressure, such as that set up in a conduit by means of an orifice plate.

Movement of the shaft 11 is transmitted to the crank 15 for turning the recording pen 5 through linkwork, the movement of which from the shaft 11 is modified by the action of the compensating device 17 (herein shown as a coiled spring Bourdon tube, which may be supposed to be responsive to one of the two pressures involved in the differential) in such manner that the crank 15 is driven from a crank arm of varying length, in order to position the pen 5 to manifest the rate of the flow, as determined by the values of the two variables of which that rate is a function. By "crank arm", I mean a length, and not necessarily a physical crank or link, the crank arm herein being a virtual crank and not a real crank, as will hereinafter more fully appear.

The linkage herein disclosed embodies solely pivotal joints, whereby an easy action, without undesirable friction, and high accuracy are attained.

Figure 2:
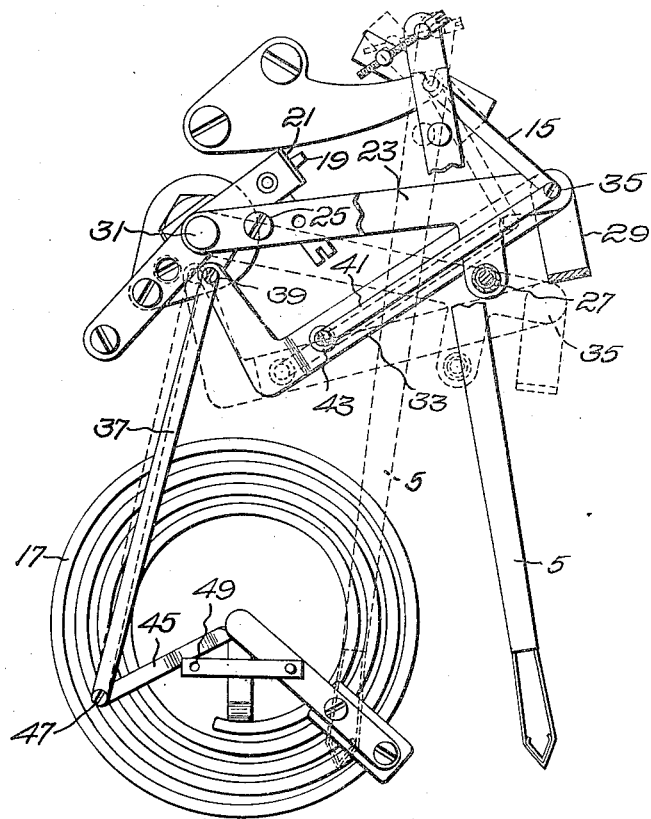
Fig. 2 is a similar view, on an enlarged scale, of the mechanism for transmitting the movements of the responsive devices to the recording pen of the instrument.

Referring more particularly to Figs. 2 and 3, the shaft 11 may carry the radially projecting pin 19, which engages the plate 21 to rotate the arm 23 with the shaft 11 and coaxially therewith. For mechanical reasons which will be readily understood, the arm 23 herein takes the form of a light, open framework, embodying two side members turning about spaced pivotal joints, and connected by the spacing pillars 25 and 27. I have applied a numeral 31 to the head of the pin forming the pivot for the outermost of these side members for convenience in referring to the elevational views, and that numeral may be understood as denoting the axis of the shaft 11, and the center of movement about which the arm 23 is turned with the shaft. At a distal point of the arm 23, that is, radially outward from the center 31, there is pivoted a lever 33 mounted on yoke 29, herein shown as an angular lever, with the concave angle between its two legs normally facing upwardly toward the arm 23. The lever 33 is also cranked between its ends, as best shown in Fig. 3, to permit its other end to move across and adjacent to the axial line 31, herein between the two side members of the arm 23.

The lever 33 is positioned by the compensating device 17, by means of the connecting rod 37 pivoted thereto at 39, the arrangement being such that the various locations of the point 39 in the operation of the instrument closely approximate the center line of the shaft 11 and the axis of the arm 23 at 31 coincident with said center line. When compensating device 17 is in the neutral position, the point 39 may coincide with the said axis.

The crank 15 of the recording pen 5 is driven from lever 33 by means of the connecting rod 41, pivoted to lever 33 at point 43, radially remote from the center at 31, and herein located on the leg of the angle lever 33 other than that on which the point 39 lies. The position of the point 43 and the length of the lever 41 are so chosen that when the arm 23 is at zero position (as shown in full lines in Fig. 2), that is, when there is no flow and thus no differential pressure, the point of connection between the connecting rod 41 and the crank 15 driven thereby lies in the plane defined by the axis of connection of lever 33 and arm 23 (that is, the axial line at 35), and the point 43. Herein, the point of connection between the crank 15 and the connecting rod 41 in the position mentioned coincides with the axis 35. Thus, whatever the movement of the compensating device 17, when the arm 23 is in the zero position there will be no movement of the pen 5, inasmuch as the axis of rotation of 33 moved by the compensating device, and of 41, the immediate driver of the crank 15 for the pen, are coincident. If, however, a differential pressure is applied to rotate the arm 23, the parts assume the dotted line position, and thus any movement of the lever 33, under action of the compensating device, has the effect of shortening or lengthening the effective distance between center line 31 and the point 43, constituting the virtual, effective crank arm acting on the crank 15 through the connecting rod 41, and thus correspondingly increasing or decreasing the ratio of movement between the rotation of the shaft 11 on the one hand and of the pen arm 5 about its axis on the other.

Theoretically, we desire to have the point 39 coincident with the axis 31 at all times. However, experience has shown the slight deviations produce no serious errors which mechanical adjustments cannot atone for when the various positions of the point 39 at all times approximate the axial line.

By suitable adjustments of angular relations of the crank 45, by which the link 37 is driven from the compensating device 17, correct products of square roots of $hP$ can be secured directly in the index arm 5, provided that by well known means the angular deflection of arm 23 is made proportional to the square root of the differential $h$.

Connection between the connecting rod 37 and the driving crank 45 therefor is made by removable screw 47. For normal calibrations I provide a tapped hole 49 in some suitable fixed position, herein on the supporting base of the Bourdon tube 17. The screw 47 may be inserted in this hole to connect the rod 37 thereto, in which case, preferably the point 39 is brought exactly in line with the axis 31. In this position, the manifesting device shows differential pressure only, and is entirely independent of the compensating element 17, and the instrument for all practical purposes is a simple differential pressure measuring device.

Referring to Fig. 3, it will be apparent that in the construction shown the ends of the side members of the frame to the left of pillar 25 may be flexed outwardly to free the pivotal trunnions thereon from the supports therefor and likewise the ends to the right of the pillar 27 may be flexed inwardly to free the frame from yoke 29. In this manner the parts may be very readily disassembled and reassembled.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A measuring instrument comprising a device responsive to a variable condition which varies with the magnitude to be measured, an arm rotated thereby, a lever pivoted at a distal point of the arm, a compensating device movable in accordance with a variable condition which latter condition modifies the proportionality of the first said condition to the magnitude to be measured, said compensating device being connected to said lever and adapted to position its point of connection thereto in positions approximating the center of motion of the arm, and a manifesting device connected to a point of the lever substantially distant radially from said center of motion, the means connecting said compensating device to the lever comprising a rigid driver disconnectable from said device and a fixed support to which said driver may alternatively be connected.

2. An apparatus for measuring a first variable and correcting such measurement by the value of a second variable comprising a supporting base, a shaft supported in the base for rotation responsively to the first variable, a frame, means adjacent one end of the frame for supporting the same by bearings coaxial with the shaft and spaced longitudinally of said axis, an arm extending radially from the shaft, a second arm extending from the frame substantially parallel to the shaft for engaging the first arm to be driven thereby, a lever and means for pivoting it to the distal end of the frame by spaced bearings providing a floating axis parallel to the shaft, a link suitably connected to and moved by mechanism responsive to a second variable pivotally connected to the lever at a point adapted to pass through the shaft axis, a manifesting device mounted on the base and adapted to rotate about an axis parallel to and remote from the shaft axis and a connecting rod, one end of which is pivotally connected to the lever between the ends thereof and the other end of which has a pivotal driving connection with the manifesting device adapted to overlie said floating axis in a predetermined position of the parts.

3. An apparatus as defined in claim 2 wherein the frame comprises side members spaced by cross members between their ends, at which ends the bearings are provided.

4. An apparatus as defined in claim 2 wherein the first lever is secured to a yoke, the arms of which provide the spaced bearings at the distal ends of the frame.

5. An apparatus as defined in claim 2 wherein the frame comprises side members spaced by cross members between their ends, at which ends the bearings are provided, which bearings comprise trunnions permitting the separation of the frame from adjacent parts and its reassembly therewith by flexion of the bearing-carrying members.

WEBSTER W. FRYMOYER.